(Model.)

T. C. HUGHES.
NUT LOCK.

No. 391,974. Patented Oct. 30, 1888.

Witnesses,
F. G. Fischer.
A. Mason.

Inventor,
Tyre C. Hughes.
By his Attorney J. C. Higdon.

UNITED STATES PATENT OFFICE.

TYRE C. HUGHES, OF KANSAS CITY, KANSAS, ASSIGNOR OF THREE-FOURTHS TO ERNEST E. SMITH, FIRMIN B. WRIGHT, AND JOHN L. STUBBLEFIELD, ALL OF SAME PLACE.

NUT-LOCK.

SPECIFICATION forming part of Letters Patent No. 391,974, dated October 30, 1888.

Application filed June 7, 1888. Serial No. 276,300. (Model.)

*To all whom it may concern:*

Be it known that I, TYRE C. HUGHES, of Kansas City, Wyandotte county, State of Kansas, have invented certain new and useful Improvements in Nut-Locks, of which the following is a full, clear, and exact description, reference being had to the accompanying drawings, forming a part hereof.

My invention relates to devices for securing different portions of structures together, particularly rail-joints; and it may be said to consist in the peculiar construction, combination, and arrangement of parts hereinafter set forth, and pointed out in the claims.

Figure 1:
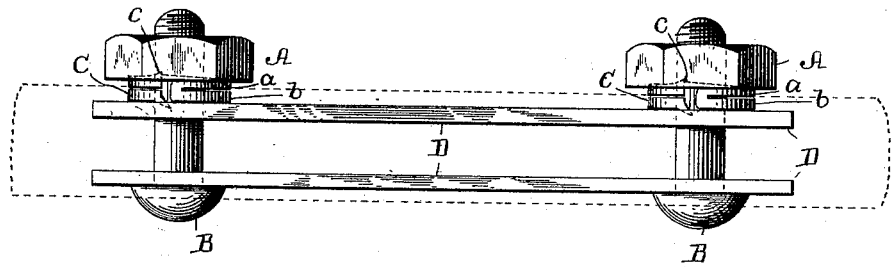
Figure 2:
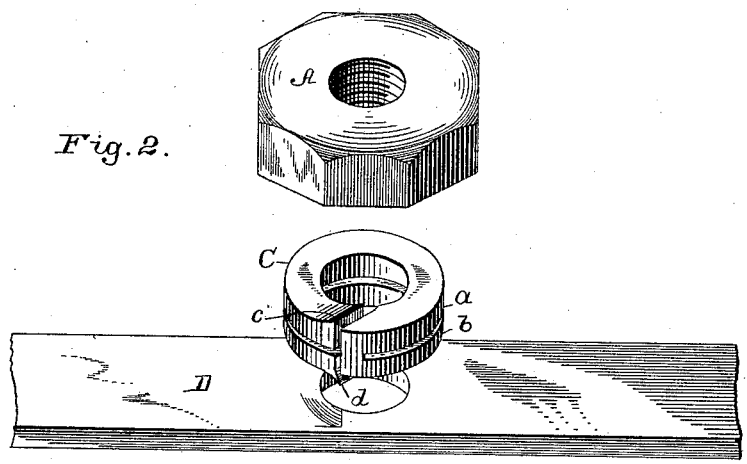
Figure 3:
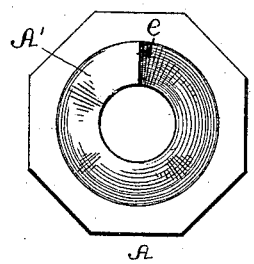

In the drawings, which illustrate the manner of carrying out my invention, Figure 1 is a plan view of the device applied to a rail-joint. Fig. 2 is a perspective view of the parts detached from each other, and Fig. 3 is a face view of the nut used in making up the invention.

A indicates an ordinary nut with a spiral recess, A', cut in its face for the reception of metallic compression-washer C. Said washer is composed of laminated coils $a$ and $b$, formed integral at one end, and having their opposite ends separated and provided with raised projections $c$ and $d$, respectively.

During use the washer C is to be located upon bolt B intermediately of fish-plate D and nut A, as an ordinary washer would be located, and upon screwing into place, the projection $c$ will come in contact with shoulder $e$ in recess A', and said washer will be revolved with said nut. As the onward movement of the nut is continued, however, said washer will be revolved therewith until said nut is properly tightened in place, when the burr or projection $d$ will slightly cut into face of fish-plate D, and thereby be prevented from turning back. The nut A is held in position and kept from turning back by reason of the fact that the pitch of the spiral recess A' is greater than that of the thread on the bolt. Consequently when the nut is to be removed it must come off of the washer faster than it comes off the bolt, which it will not do unless aided by a wrench. The nut A is thus securely locked in position until removed by hand in the ordinary way.

Having thus described my invention, what I claim is—

1. An improved nut-fastener composed of two laminated rings of metal cut at a point common to both, formed integral at corresponding ends, and having their opposite ends free and separated, and a cutting projection formed upon the outer face of one ring at its free end, substantially as described.

2. An improved nut-fastener composed of two laminated rings, $a$ $b$, cut at a common point, secured together at corresponding ends, and having their opposite ends separated and provided with raised projections $c$ and $d$, respectively, said projections being oppositely located upon the outer faces of said rings, substantially as described.

In testimony whereof I affix my signature in presence of two witnesses.

TYRE C. HUGHES.

Witnesses:
F. G. FISCHER,
J. C. HIGDON.